US008910062B2

(12) United States Patent
Bangor

(10) Patent No.: US 8,910,062 B2
(45) Date of Patent: Dec. 9, 2014

(54) METHOD AND SYSTEM FOR PERFORMING NETWORK PROVISIONING

(75) Inventor: Aaron W. Bangor, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 3921 days.

(21) Appl. No.: 10/267,068

(22) Filed: Oct. 7, 2002

(65) Prior Publication Data

US 2004/0066930 A1    Apr. 8, 2004

(51) Int. Cl.

| G06F 17/00 | (2006.01) |
|---|---|
| H04M 3/42 | (2006.01) |
| G06F 9/45 | (2006.01) |
| G06F 9/54 | (2006.01) |
| G06F 1/32 | (2006.01) |
| G06F 21/31 | (2013.01) |
| G06F 11/36 | (2006.01) |

(52) U.S. Cl.
CPC ........... *H04M 3/42153* (2013.01); *G06F 8/457* (2013.01); *G06F 8/458* (2013.01); *G06F 9/547* (2013.01); *G06F 1/3209* (2013.01); *G06F 1/3206* (2013.01); *G06F 21/313* (2013.01); *G06F 11/3632* (2013.01); *H04M 3/42* (2013.01); *H04M 3/42161* (2013.01); *H04M 2203/2044* (2013.01); *H04M 2207/35* (2013.01)
USPC ........... 715/762; 715/204; 715/206; 715/234; 715/235; 715/243; 715/273; 715/731; 715/736; 379/219

(58) Field of Classification Search
CPC ..... G06F 9/547; G06F 1/3206; G06F 21/313; G06F 1/3209; G06F 11/3632; G06F 8/457; G06F 8/458

USPC .............. 715/501.1, 517, 762–764, 781–783, 715/805, 817, 845, 204, 209, 234, 235, 243, 715/273, 731, 736, 744; 709/223, 229; 707/4; 705/29; 379/265.11, 219
See application file for complete search history.

(56) References Cited

U.S. PATENT DOCUMENTS

| 5,625,781 | A | | 4/1997 | Cline et al. ................... 395/335 |
|---|---|---|---|---|
| 5,742,768 | A | | 4/1998 | Gennaro et al. ............... 295/200 |
| 5,956,024 | A | * | 9/1999 | Strickland et al. ............ 715/717 |
| 5,958,016 | A | * | 9/1999 | Chang et al. ................... 709/229 |
| 5,978,648 | A | | 11/1999 | George et al. ................. 434/362 |
| 6,195,097 | B1 | | 2/2001 | Shrader et al. ................ 345/356 |
| 6,286,050 | B1 | * | 9/2001 | Pullen et al. .................. 709/229 |
| 7,110,525 | B1 | * | 9/2006 | Heller et al. ............. 379/265.11 |
| 7,145,898 | B1 | * | 12/2006 | Elliott ........................... 370/352 |
| 2002/0174118 | A1 | * | 11/2002 | Bates et al. ....................... 707/4 |
| 2004/0039846 | A1 | * | 2/2004 | Goss et al. .................... 709/248 |
| 2004/0044726 | A1 | * | 3/2004 | Owayed et al. ............... 709/203 |

(Continued)

OTHER PUBLICATIONS http://www.net2phone.com/home.ltml (Net2Phone, The Home of Internet Telephony); © 1996, Jun. 24, 2002.

(Continued)

*Primary Examiner* — Quoc A Tran
(74) *Attorney, Agent, or Firm* — Jackson Walker L.L.P.

(57) ABSTRACT

According to one embodiment of the invention, a method for providing a computerized provisioning environment for a service agent performing provisioning of intelligence network services is provided. The method includes grouping the identity information of the service agent, a plurality of navigation links directed to information pages, and a plurality of task links directed to a task pages into separate sections. The method also includes displaying the separate sections on a same single layout.

13 Claims, 4 Drawing Sheets

(56) References Cited

U.S. PATENT DOCUMENTS

| | | | |
|---|---|---|---|
| 2004/0107277 A1* | 6/2004 | Levesque et al. | 709/223 |
| 2004/0193512 A1* | 9/2004 | Gobin et al. | 705/29 |
| 2005/0204030 A1* | 9/2005 | Koch et al. | 709/223 |

OTHER PUBLICATIONS http://www.attws.com (AT&T Wireless), Oct. 4, 2002.

https://www.novusnet.com/discover/cgi-bin/dcstmnt?page=signon.htm (Discovery Financial Services), Oct. 4, 2002.

http://www.buddyphone.com (buddyPhone—internet communication), Oct. 4, 2002.

http://www.phoneplusmag.com/services.asp?vpi=login (Phone+Online Services), Oct. 4, 2002.

http://www.sprintbiz.com/online_store/ (Sprint Business Online Store), Oct. 4, 2002.

http://investors.com (Investor's Business Daily), Oct. 4, 2002.

http://shopping.yahoo.com/y=s:276149,d:22708228, p:s, l:yahoo-fp-trough (Yahoo! Shopping), Jun. 24, 2002.

* cited by examiner

METHOD AND SYSTEM FOR PERFORMING NETWORK PROVISIONING

TECHNICAL FIELD OF THE INVENTION

This invention relates generally to the field of communications and more particularly to a method and system for performing network provisioning.

BACKGROUND OF THE INVENTION

When the telephone industry was deregulated, the telephone service providers could not easily manipulate the telephone network architectures to offer a variety of telephone services to customers. To overcome this technological obstacle, new and more flexible telephone network architectures were created. One example of such an architecture is the Advanced intelligent network ("AIN"). The flexibility of AIN stems in part from the separation of the service logic from the switching equipment. A service agent may assemble a service package for a customer simply by programming the service logic rather than physically reconfiguring the switching equipment. The programming of the service logic is referred to as "network provisioning."

To perform network provisioning, a service agent needs a computerized work environment. The computerized work environment provides a variety of reference information and input fields that a service agent may use to enter programming data. However, many service agents find conventional work environments cumbersome because links to certain task pages and information are difficult to locate. Further, service agents may be required to locate and select numerous links before a desired page comprising a particular input field or information may be reached. These problems result in inefficient performance of network provisioning.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Embodiments of the invention are best understood by referring to FIGS. 1 through 5 of the drawings, like numerals being used for like and corresponding parts of the various drawings.

Figure 1:
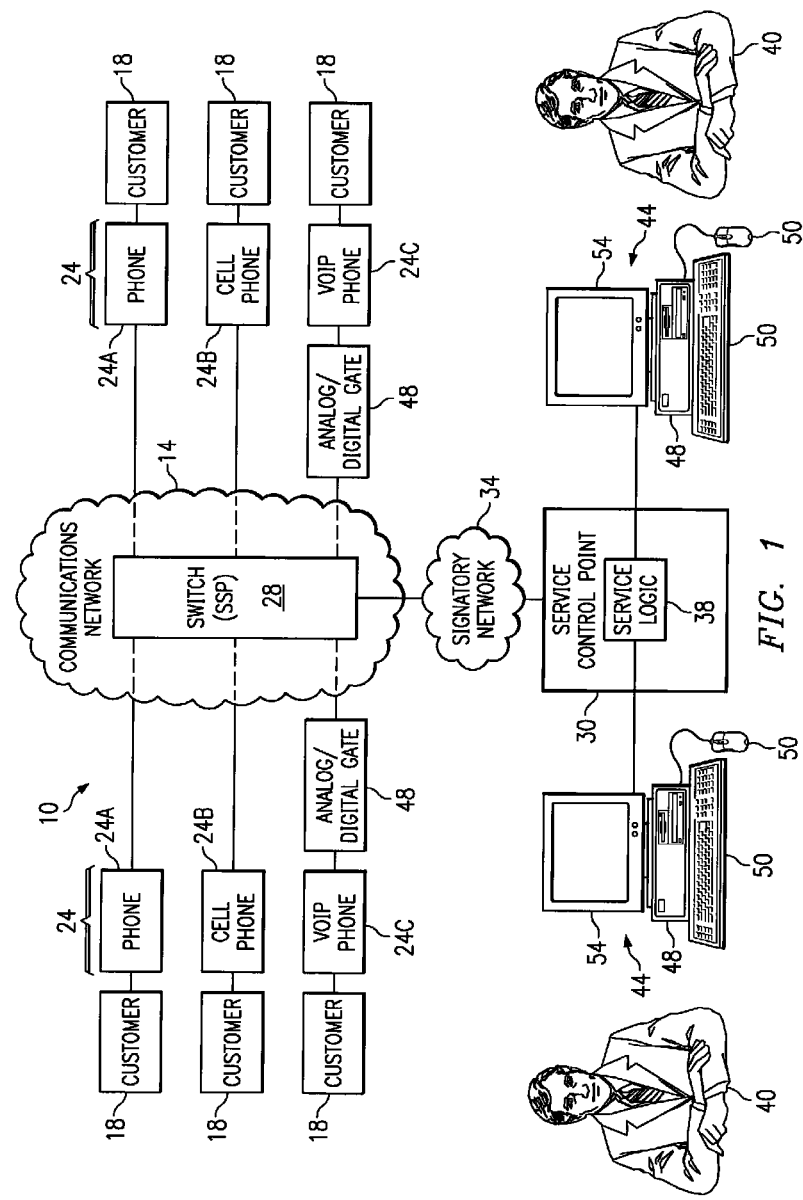
FIG. 1 is a schematic diagram of one embodiment of a communications system that may benefit from the teachings of the present invention.

FIG. 1 illustrates a schematic diagram of an embodiment of a communications system 10 that may benefit from the teachings of the present invention. System 10 comprises a communications network 14 that allows customers 18 to communicate with each other using various communications devices 24. A switch 28, also referred to as service switching point ("SSP"), handles calls from one customer 18 to another customer 18 according to the instructions from a service control point ("SCP") 30. Switch 28 and SCP 30 communicate with one another over a signaling network 34; however, signal network 34 may be omitted where in-band signaling is used. A service logic 38, located at SCP 30, is used to generate the instructions for switch 28. Service logic 38 may be a computer program that is operable to control SSP 28 and provide a variety of communications services for customer 18. For example, service logic 38 may be configured to command SSP 28 to direct an incoming toll free call to a particular phone number; however, many other types of services may be provided by service logic 38. A service agent 40 may program service logic 38 using a computer system 44 that is coupled to service logic 38. The programming of service logic 38, which includes adding, deleting, and adjusting communications services for customers 18, is referred to as "network provisioning" or "provisioning."

Examples of communications devices 24 may include a conventional telephone 24A, a wireless phone 24B and a Voice over Internet Protocol ("VoIP") phone 24C. Certain communications devices 24 may require one or more supporting devices. For example, VoIP phone 24C may require a digital-to-analog/analog-to-digital gate 48 to communicate over any portion of communications network 14 that is a Plain Old Telephone Network ("POTS").

Communications network 14 may be any communications network that is operable to carry communications signals. For example, communications network 14 may be a telephone network, internet, digital network, an optical network, a cable network, or any combination of these and other examples.

SSP 28 is conventionally located in a central office of a telephone company; however, any suitable device that is operable to handle a call from customer 18 according to the instructions provided by SCP 30 may be SSP 28. SCP 30 may be any computing device that is operable to execute the logic of service logic 38 to generate and communicate instructions to SSP 28. Signaling network 34 is any communications network or channel that is operable to carry communication signals between SSP 28 and SCP 30. An example of signaling network 34 is Signaling System 7 network ("SS7"); however, other out-of-band signaling methods may also be used. Service logic 38 is any program operable to handle a call according to a set of instructions. For example, service logic 38 may be programmed to direct a call for a particular phone number to another number. If one customer 18 dials "1-800-123-4567" on Monday at 11:00 am, then service logic 38 may be programmed to direct the call to another customer 18 having an actual phone number of "1-111-111-1111". But if the same number "1-800-123-4567" is dialed on a weekend between 9:00 pm to 7:00 am, then service logic 38 may be programmed to block the call or direct the call to an answering service. A variety of other instructions and conditions may be programmed into service logic 38 to provide other services to a subscribed customer 18.

Computer system 44 comprises a computer 48 that is coupled to one or more input devices 50 and an output device 54. In FIG. 1, a keyboard 50 and a mouse 50 are shown as input devices 50, and monitor 54 is shown as output device 54; however, other input devices and output devices may be input device 50 and output device 54, respectively. Computer system 44 may also have a communications device (not explicitly shown), such as a modem, for interfacing with communications network 14 and/or service logic 38. In some embodiments, computer system 44 may be located within SCP 30 and used to store and execute service logic 38. Other methods of providing directions on how to handle calls to SSP 28 may be well-known by one skilled in the art.

Service agent 40 may use computer system 44 to perform network provisioning. Performing network provisioning for each customer 18 requires service agent 40 to access various task pages and information pages using a provisioning environment. A "provisioning environment" is a graphical user interface ("GUI") that lays out pertinent information and the links to information pages and task pages for service agent 40. A "link" refers to a hyperlink or any other displayed item that, when selected, initiates the display of any associated information or functionality. The information may be displayed as a pop-up window, a flag, a tag, or in any other suitable form. A "task page" refers to a screen display comprising input fields, where service agent 40 may enter appropriate input to perform a particular provisioning task, such as routing a toll free call to a different phone number. An "information page" refers to a screen display comprising a particular category of information that may be helpful for performing network provisioning.

An example of service agent 40 performing network provisioning is as follows: If service agent 40 is adjusting conditions regarding a particular toll free number, service agent 40 may need to access, by selecting the appropriate links, the toll free number task page having various input fields, customer's 18 account number, phone number, a calendar, the time region where the customer's 18 resides, and other information. However, conventional provisioning environments may not lay out these links in a manner that allows convenient and speedy access. For example, service agent 40 may be required to select multiple links to navigate through multiple layouts of information or task pages before locating a particular link that is directed to a desired information or task page. Furthermore, the hierarchy of task pages and information pages may be such that service agent 40 may be required to select multiple links before reaching the desired task page or information page. This, coupled with the difficulty in locating the appropriate links, may cause provisioning inefficiencies that are multiplied when multiple provisioning tasks are performed by service agent 40.

According to some embodiments of the present invention, a method and system are provided that allow various task page links and information page links to be categorized and displayed on a same single layout. This is advantageous in some embodiments of the invention because consolidating the links into a same single layout and categorizing the links within the same single layout make it easier to locate a particular link by reducing the number of layouts that a service agent may have to navigate through before locating the particular link. In another embodiment, fewer steps are required to reach a particular task page or information page because links for subcategories of task pages and information pages are categorized and displayed on the same single layout. In another embodiment, network provisioning is made more efficient by accentuating certain categories of links. Additional details of example embodiments of the invention are described in greater detail below in conjunction with FIGS. 2 through 5.

Figure 2:
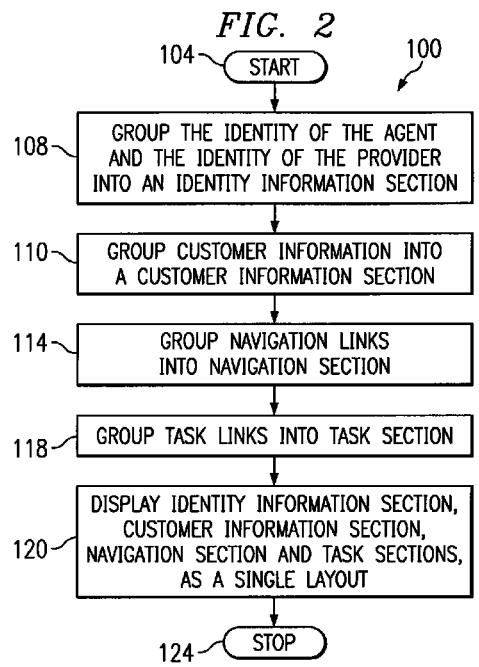
FIG. 2 is a flow chart of one embodiment of a method for displaying a network provisioning environment.

FIG. 2 is a flow chart of a method 100 for displaying a network provisioning environment that may be used by a communications service provider, such as a telephone service provider. Method 100 may be used for provisioning tasks associated with advanced intelligent network ("AIN"), capability set 1 ("CS-1"), or other intelligence networks. In one embodiment, method 100 may be performed by computer system 44, described in greater detail below in conjunction with FIG. 3; however, other suitable devices may be used to perform some or all of the acts of method 100. Method 100 starts at step 104. At step 108, identity information of service agent 40 is grouped into an identity information section. In one embodiment, the identity of the relevant communication service provider may also be grouped into the identity information section. Some embodiments of an identity information section are described below in conjunction with FIGS. 4 and 5. Identity information of service agent 40 may be any information that identifies a service agent 40. For example, identity information may comprise an employee number of service agent 40, service agent's 40 name, provisioning environment user identification, social security number, email address prefix, or other information that may identify service agent 40. An identity information section may occupy any identifiable portion of a single layout that may display service agent's 40 identity information. Some embodiments of a single layout are described below in conjunction with FIGS. 4 and 5.

At step 110, customer identity information is grouped into a customer information section. Some embodiments of a customer information section are described below in conjunction with FIGS. 4 and 5. In one embodiment, step 110 may be omitted. Customer identity information may be any information that identifies a particular customer 18. For example, customer identity information may comprise an account number of an account associated with customer 18, customer's 18 name, social security number, or other information that may identify customer 18. Some embodiments of a customer information section are described below in conjunction with FIGS. 4 and 5. A customer information section may occupy any identifiable portion of a single layout that may display customer's 18 identity information.

At step 114, navigation links are grouped into a navigation section. A "navigation link" refers to a link that is directed to one or more information pages. Some embodiments of a navigation section are described below in conjunction with FIGS. 4 and 5. A navigation section may occupy any identifiable portion of a single layout that may display one or more navigation links.

At step 118, task links are grouped into a task section. A "task link" refers to a link that is directed to one or more task pages. Some embodiments of a task section are described below in conjunction with FIGS. 4 and 5. A task section may occupy any identifiable portion of a single layout that may display one or more task links.

At step 120, an identity information section, customer information section, navigation section and task section are displayed on a single layout. This is advantageous in some embodiments because the links and information that may be grouped into these sections are frequently used in conjunction when performing network provisioning. In one embodiment, the identity information section and customer information section remain displayed in their respective positions within the same single layout when links are selected to display a particular information page or task page. In one embodiment, customer information section may be omitted. In another embodiment, identity information section, customer information section, navigation section and task sections are positioned in portions of the same single layout having different color backgrounds. In another embodiment, the respective links displayed within the navigation section and task section have different colors. For example, navigation links may be in red, while task links may be in blue. This is advantageous in some embodiments of the invention because the differences in color may be better recognized than the differences in the alphanumeric characters that form the link. This allows service agent 40 to more quickly locate certain links. Method 100 stops at step 124.

In one embodiment, links may be selected using one click of mouse 50 rather than multiple clicks. This is advantageous in some embodiments because the amount of time expended to select a link is reduced. In one embodiment, task links may be further categorized into different subcategories of tasks. This is advantageous in some embodiments of the invention because service agent's 40 ability to quickly locate a particular navigation or task link is enhanced. Further, categorizing multiple links on a single layout allows more links to be displayed at the same time without causing information overload. Displaying more links minimizes the number of steps that service agent 40 may be required take to reach a particular information page or task page.

Figure 3:
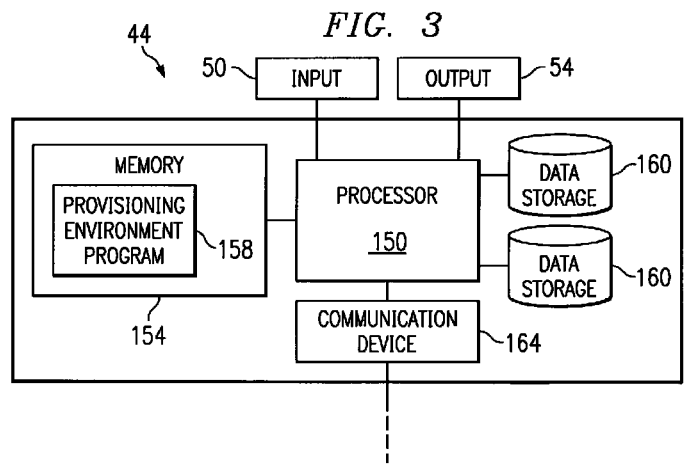
FIG. 3 is a block diagram of one embodiment of a computer system shown in FIG. 1.

FIG. 3 is a block diagram illustrating one embodiment of computer system 44 shown in FIG. 1. In one embodiment, computer system 44 may be used to perform some embodiments of method 100 shown in FIG. 2. Computer system 44 comprises a processor 150, a memory 154 storing a provisioning environment program 158, and one or more data storage units 160 for storing data related to program 158 or other data. In some embodiments, service logic 38 may also be stored in memory 154 or data storage unit 160. Computer system 44 may also comprise a communication device 164, such as a modem or other suitable interface device that enables processor 150 to communicate with service logic 38. Processor 150 is coupled to memory 154 and one or more data storage units 160. Processor 150 is also coupled to input unit 50 and output unit 54. Processor 150 is operable to execute the logic of provisioning environment program 158 and access any data storage units 160 to retrieve or store data. Examples of processor 150 are the Pentium™ series processors, available from Intel Corporation.

Memory 154 and data storage units 160 may comprise files, databases, or other suitable forms of data. Memory 154 and data storage units 160 may be random access memory, read only memory, CD-ROM, removable memory devices, or any other suitable devices that allow storage and/or retrieval of data. Memory 154 and data storage units 160 may be interchangeable and may perform the same functions.

Provisioning environment program 158 is a computer program that generates a provisioning environment for service agent 40 to access information and task pages using categorized links. In some embodiments, program 158 may be an integral part of service logic 38; however, program 158 may exist as a separate entity that is operable to configure the program of service logic 38 according to the data entered by service agent 40. In embodiments where program 158 is co-located with service logic 38, service agent 40 may perform network provisioning at a computer that stores and executes both program 158 and service logic 38. To enable service agent 40 to perform the network provisioning tasks, program 158 is operable to generate and display the appropriate links and relevant information as a same single layout. The single layout may be displayed by output unit 54, such as monitor 54. In some embodiments, program 158 may be operable to perform some or all of the acts of some embodiments of method 100 shown in FIG. 2 to generate and display a single layout of information and links. In one embodiment, program 158 may be operable to access several categories of data from one or more databases stored in different locations and display the data and/or links to the data on a same single layout. In some embodiments, program 158 may be operable to display the same single layout as a web site shown through a window of a web browser. An example of program 158 that may incorporate some embodiments of the present invention is Provision Order Management and Provisioning Graphic User Interface, available from SBC technology.

Provisioning environment program 158 may reside in any storage medium, such as memory 154 and data storage unit 160. Program 158 may also reside in data storage units of other computers, such as a hard disk drive of a remotely located web server or a computing device that stores and executes service logic 38. Although FIG. 3 shows program 158 as a software program, program 158 may also be programmed in a variety of hardware, such as a digital signal processor, application specific integrated circuit, or other suitable hardware. Provisioning environment program 158 may be written in any suitable language, including C, C++, any version of Hypertext Markup Language ("HTML"), and any version of Extensible Markup Language ("XML").

Figure 4:
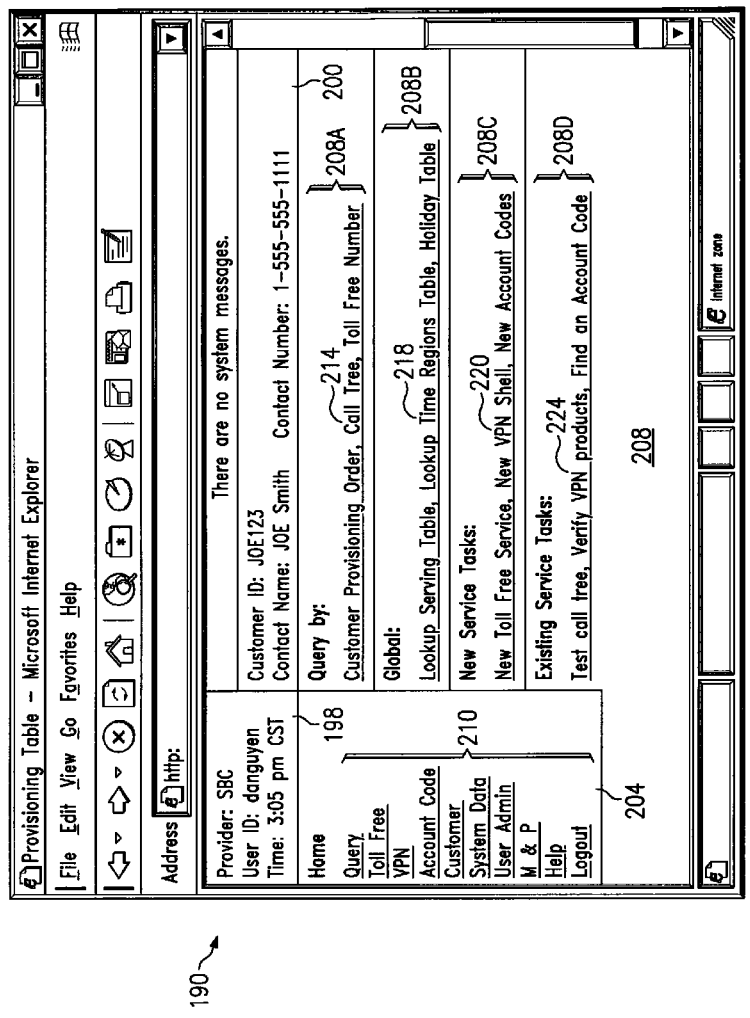
FIG. 4 is a schematic diagram illustrating one embodiment of a layout that may be generated using the method of FIG. 2 and displayed using the system of FIG. 3.

FIG. 4 is a schematic diagram illustrating one embodiment of a same single layout 190 that may be generated and displayed using computer system 44 and method 100. Layout 190 comprises an identity information section 198, a customer information section 200, a navigation section 204, and a task section 208. In one embodiment, customer information section 200 may be omitted. In one embodiment, task section 208 may have subsections 208A through 208D comprising subcategories of task links. As shown in FIG. 4, identity information section 198, customer information section 200, navigation section 204, and task section 208 are all arranged on same single layout 190 and within their respective areas. The respective areas do not require a visible boundary mark, such as a line. In one embodiment shown in FIG. 4, identity information section 198 is positioned in the upper left area of layout 190. Customer information section 200 is positioned next to identity information section 198. Navigation section 204 is positioned below identity information section 198, and task section 208 is positioned next to navigation section 204. However, sections 198, 200, 204, and 208 may be positioned in other suitable locations within layout 190 based on the different preferences of service agents 40. For example, identity information section 198 may be positioned in the lower left corner of layout 190. In one embodiment, task section 208 occupies the largest area of layout 190. This is advantageous in some embodiments because task section 208 may include the most links or most frequently selected links. Thus, having a task section 208 that occupies the largest area makes it convenient for service agents 40 to locate the task links. The respective size, color, borders, and other characteristics of sections 198, 200, 204, and 208 may be varied. For example, identity information section 198, customer information section 200, navigation section 204, and task section 208 may have medium blue, white, yellow, and light gray backgrounds, respectively. In one embodiment, alphanumeric characters in identity information section 198, customer information section 200, navigation section 204, and task section 208 may be in white, black, orange, and green characters, respectively.

As described in conjunction with method 100, one embodiment of identity information section 198 comprises information that identifies a particular customer 14. Identity information section 198 may also comprise links to information that may identify a particular customer 18. In one embodiment, identity information section 198 comprises the name of the service provider shown as "SBC." However, other companies names, such as AT&T™, may be identified in identity information section. A user identification of service agent 40 is shown as "danguyen." In the example shown in FIG. 4, the current time is also shown in identity information section; however, other embodiments of identity information section 198 may comprise other types of identity information of service agent 40 and may exclude the date/time information or the identity information concerning the service provider.

In one embodiment, customer information section 200 comprises information titled as "customer ID," "contact name," and "contact number." However, other information that may identify customer 18 may be included in customer information section 200. In one embodiment, navigation section 204 may include various information links 210 that are directed to different categories of provisioning information. For example, selecting link 210 shown as "Account Code" may initiate a display of a list of accounting codes and their corresponding explanations in plain English. In another example, selecting link 210 shown as "Help" may initiate a display of a list of other links to various categories of help information. The title of section 204 and the specific categories of information associated with information links 210 may vary without departing from the scopes of some embodiments of the invention.

In one embodiment, task section 208 comprises various task links directed to task pages. For example, selecting a link 214 shown as "Customer" under a subcategory 208A titled "Query by" initiates a display of a task page comprising a field for inputting a customer identity information of a particular customer 18 to obtain the details of a service package associated with the customer 18. Other task links in subcategory 208A may be directed to other task pages that allow service agent 40 to search for the details of a service package of a particular customer using different information associated with customer 18, as shown in FIG. 4.

In one embodiment, selecting a link 218 shown as "Lookup Time Regions Table" under a subcategory 208B titled "Global" initiates a display of a task page comprising a field for inputting a location identifier to determine the time zone of a location. For example, in one embodiment, the task page associated with link 218 may prompt service agent 40 to enter a zip code in a particular input field. Upon entering "75201" in the zip code field, program 158 may display an answer stating that the zip code of "75201" is in Central Time Zone. Other task links in subcategory 208B may be directed to other task pages that allow service agent 40 to search for task-specific information that may be required for service agent 40 to perform network provisioning, as shown in FIG. 4.

In one embodiment, selecting a link 220 shown as "New Toll Free Service" under a subcategory 208C titled "New Service Tasks" initiates a display of a task page comprising one or more input fields for establishing a new toll free number service. For example, in one embodiment, the task page associated with link 220 may comprise an input field for entering the phone number to which a toll free call may be forwarded. The task page may also have other input fields for entering times, dates, call block features, and other services.

In one embodiment, selecting a link 224 shown as "Find an Account Code" under a subcategory 208D titled "Existing Service Tasks" initiates a display of a task page that allows service agent 40 to ascertain one or more account codes of a particular customer. For example, a customer named "ABC Company" may be associated with an account code of "ABC" for billing purposes. In an input field of a task page associated with link 224, service agent 40 may enter the phrase "ABC Company." Program 158 may then display the code "ABC" in response to receiving the input. In another embodiment, a customer may have more than one associated account code. For example, a customer named "ABC Company" may have an account code of "ABC1" for long distance service and "ABC2" for local telephone service. Subcategories, such as subcategories 208A through 208D, of task section 208 may be greater or fewer in number and may have different appearances. Further, subcategories may be established using different criteria, as determined by the particular provisioning needs of different communications service providers. The titles and the key words used to describe the links of various sections 198, 200, 204, and 208 may vary depending on the categories of task and information pages that may be available for service agent 40 to perform network provisioning for a particular service provider.

Figure 5:
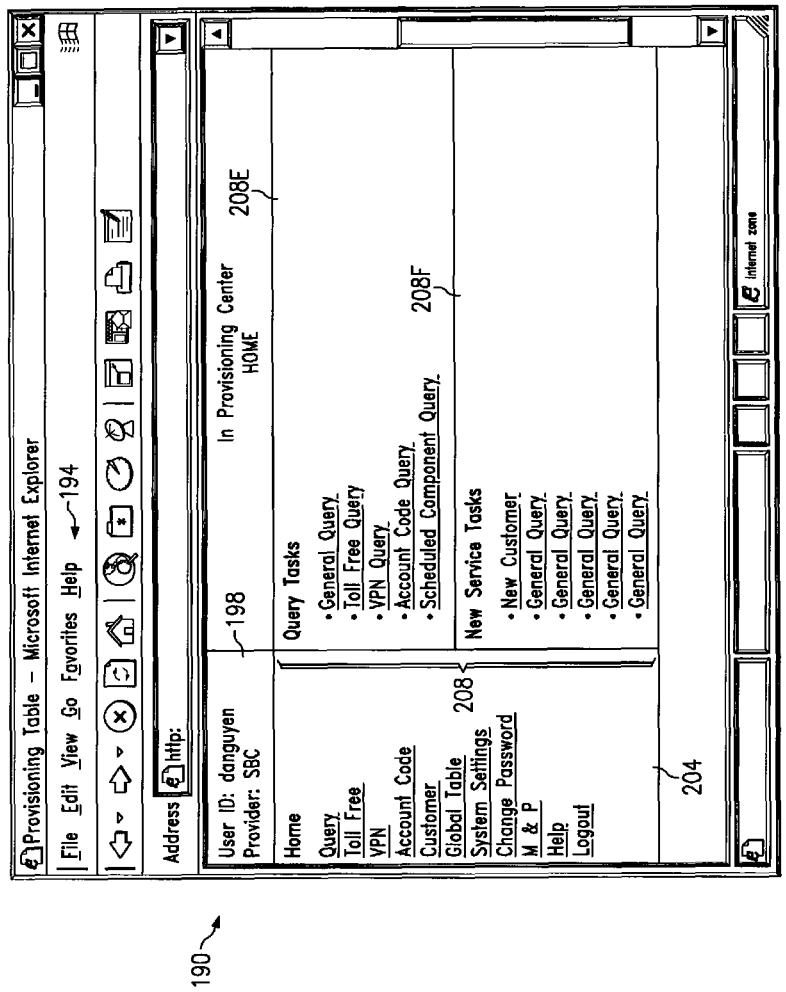
FIG. 5 is a schematic diagram illustrating one embodiment of a layout that may be generated using the method of FIG. 2 and displayed using the system of FIG. 3.

FIG. 5 is a schematic diagram of one embodiment of single layout 190. In one embodiment of the invention, single layout 190 may be displayed as a web site that is viewable through a web browser window 194; however, single layout 190 may have an appearance of any information layout generated by any web-based or client-based application. An example of web browser window 194 is one generated by any version of Microsoft Internet Explorer™, available from Microsoft Corporation. In the embodiment of layout 190 shown in FIG. 5, customer information section 200 is omitted. Task section 208 is divided into two subcategories 208E and 208F. The number of subcategories may vary depending on the network provisioning that is performed by a particular service provider. In one embodiment, section 198 comprises an identity of service agent 40 shown as "danguyen" and an identity of the service provider shown as "SBC."

Although some embodiments of the present invention have been described in detail, it should be understood that various changes, substitutions, and alterations can be made hereto without departing from the spirit and scope of the invention as defined by the appended claims.

What is claimed is:

1. A method for providing a computerized provisioning environment for a service agent performing provisioning of intelligence network services, comprising:

grouping identity information, indicative of an identity of the service agent, into an identity information section;

grouping a plurality of navigation links into a navigation section, each of the plurality of navigation links directed to a particular information page comprising information concerning the provisioning of the intelligence network services;

grouping a plurality of task links into a task section, each of the plurality of task links directed to a particular page for performing a task associated with the provisioning of the intelligence network services; and grouping the identity of a provider of the advanced intelligent network services into the identity information section;

wherein grouping a plurality of task links into a task section comprises grouping, within the task section, the plurality of task links into a plurality of categories and displaying the task section on a same single layout comprises positioning the categorized groups of the task links in different portions of the task section;

displaying the identity information section, the navigation section, and the task section on a same single layout.

2. The method of claim 1, and further comprising grouping one or more customer identity information into a customer information section, wherein displaying comprises displaying the identity information, the customer information section, the navigation section, and the task section on a same single layout.

3. The method of claim 1, wherein displaying the identity information section, the navigation section, and the task section in a same single layout comprises displaying a particular corresponding color background for each of the identity information section, the navigation section, and the task section.

4. The method of claim 1, wherein the identity information is indicative of the identity of a human service agent.

5. The method of claim 1, wherein displaying the identity information section, the navigation section, and the task section in a same single layout comprises:
- positioning the identity information section at the upper corner of the same single layout;
- positioning the navigation section under the identity information section; and
- positioning the task section next to the navigation section.

6. The method of claim 1, wherein displaying comprises displaying the same single layout as a web site accessed by a web browser.

7. A system for providing a computerized provisioning environment for a service agent performing provisioning of intelligence network services, comprising:
- a computer system having a processor and a display unit;
- a computer readable medium storing a program, the program operable, when executed on the processor, to:
- group identity information, indicative of an identity of the service agent, in an identity information section;
- group one or more customer identity information in a customer information section;
- group a plurality of navigation links into a navigation section, each of the plurality of navigation links directed to a particular information page comprising information concerning the provisioning of the intelligence network services;
- group a plurality of task links into a task section, each of the plurality of task links directed to a particular page for performing a task associated with the provisioning of the intelligence network services; and
- wherein the program is operable to continually display the identity information group in a same position in the same single layout when the particular page comprising the information or the particular page for performing the task is displayed;
- display the identity information section, the customer information section, the navigation section, and the task section on a same single layout.

8. The system of claim 7, wherein the program is operable to display the identity information section, the customer information section, the navigation section, and the task section in a same single layout by displaying a particular corresponding color background for each of the identity information section, the customer information section, the navigation section, and the task section.

9. The system of claim 7, wherein the navigation links are displayed in a first color and the task links are displayed in a second color.

10. The system of claim 7, wherein the program is operable to display the identity information section, the customer information section, the navigation section, and the task section in a same single layout by positioning the identity information section at the upper corner of the same single layout, positioning the customer information next to the identity information section, positioning the navigation section under the identity information section, and positioning the task section under the customer information section and next to the navigation section.

11. The system of claim 7, wherein the program is further operable to group the identity of a provider of the advanced intelligent network services into the identity information section.

12. The system of claim 7, wherein the program is operable to group a plurality of task links into a task section by grouping, within the task section, the plurality of task links into a plurality of categories, and wherein the program is operable to display the task section on a same single layout by positioning the categorized groups of the task links in different portions of the task section.

13. The system of claim 7, wherein program is operable to display by displaying the same single layout as a web site that is accessed by a web browser.

* * * * *